United States Patent [19]

Ito

[11] Patent Number: 5,751,498
[45] Date of Patent: May 12, 1998

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 575,772

[22] Filed: Dec. 20, 1995

[30] Foreign Application Priority Data

Dec. 22, 1994 [JP] Japan ................... 6-320988
Aug. 7, 1995 [JP] Japan ................... 7-200703

[51] Int. Cl.$^6$ ................................. G02B 15/14
[52] U.S. Cl. ................ 359/692; 359/689; 359/691
[58] Field of Search ................ 359/691, 692, 359/689

[56] References Cited

U.S. PATENT DOCUMENTS

| | | | |
|---|---|---|---|
| 4,720,179 | 1/1988 | Ito | 359/692 |
| 4,818,081 | 4/1989 | Ito | 359/692 |
| 4,836,660 | 6/1989 | Ito | 359/692 |
| 4,906,077 | 3/1990 | Ito | 359/692 |
| 4,909,613 | 3/1990 | Kikuchi | 359/689 |
| 4,984,877 | 1/1991 | Ito | 359/692 |
| 5,000,549 | 3/1991 | Yamazaki | 359/691 |
| 5,126,884 | 6/1992 | Sato | 359/692 |
| 5,144,489 | 9/1992 | Shibayama | 359/689 |
| 5,229,887 | 7/1993 | Hayashi | 359/692 |
| 5,270,861 | 12/1993 | Estelle | 359/692 |
| 5,270,867 | 12/1993 | Estelle | 359/692 |
| 5,280,390 | 1/1994 | Ito | 359/691 |
| 5,309,285 | 5/1994 | Ito | 359/691 |
| 5,339,195 | 8/1994 | Ogata | 359/691 |
| 5,353,163 | 10/1994 | Shibayama et al. | 359/692 |
| 5,371,631 | 12/1994 | Takada | 359/691 |
| 5,434,712 | 7/1995 | Ito | 359/691 |
| 5,526,187 | 6/1996 | Lee | 359/692 |
| 5,528,428 | 6/1996 | Ohtake et al. | 359/691 |

FOREIGN PATENT DOCUMENTS

| | | |
|---|---|---|
| 63-161422 | 5/1988 | Japan . |
| 2258056 | 1/1993 | United Kingdom . |
| 2258320 | 2/1993 | United Kingdom . |

*Primary Examiner*—David C. Nelms
*Assistant Examiner*—Evelyn Lester
*Attorney, Agent, or Firm*—Greenblum & Bernstein, P.L.C.

[57] ABSTRACT

A zoom lens system includes a first lens group having a positive focal length and a second lens group having a negative focal length, arranged in this order from the object side. A zooming operation of the lens system is carried out by varying the distance between the first and second lens groups. The first lens group may include a first sub-group and a second sub-group. The first sub-group and the second sub-group may each be provided with at least one negative lens element. The zoom lens system preferably satisfies the relationships defined by (1) $3.5<f_L/f_1<5.0$; (2) $1.77<N_{1\,a\,N}$; (3) $35<\upsilon_{1\,a\,N}<50$; (4) $1.77<N_{1\,b\,N}$; and (5) $35<\upsilon_{1\,b\,N}<50$; wherein "$f_L$" represents the focal length of the whole lens system at a telephoto extremity, "$f_1$" represents the focal length of the first lens group, "$N_{1\,a\,N}$" represents the refractive index of the negative lens element of the first sub-group at the d-line, "$\upsilon_{1\,a\,N}$" represents the Abbe number of the negative lens element of the first sub-group, "$N_{1\,b\,N}$" represents the refractive index of the negative lens element of the second sub-group at the d-line, and "$\upsilon_{1\,b\,N}$" represents the Abbe number of the negative lens element of the second sub-group, respectively.

20 Claims, 10 Drawing Sheets

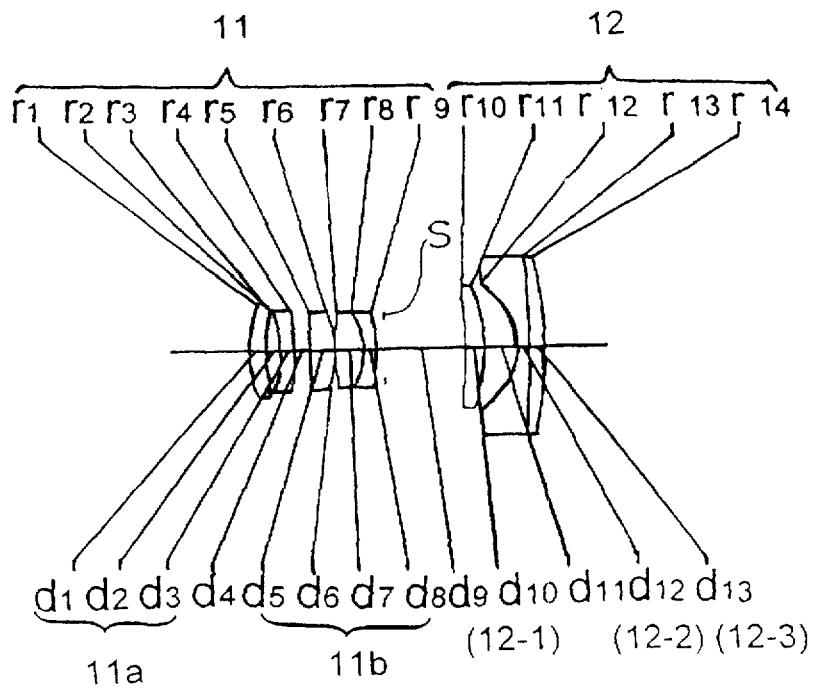
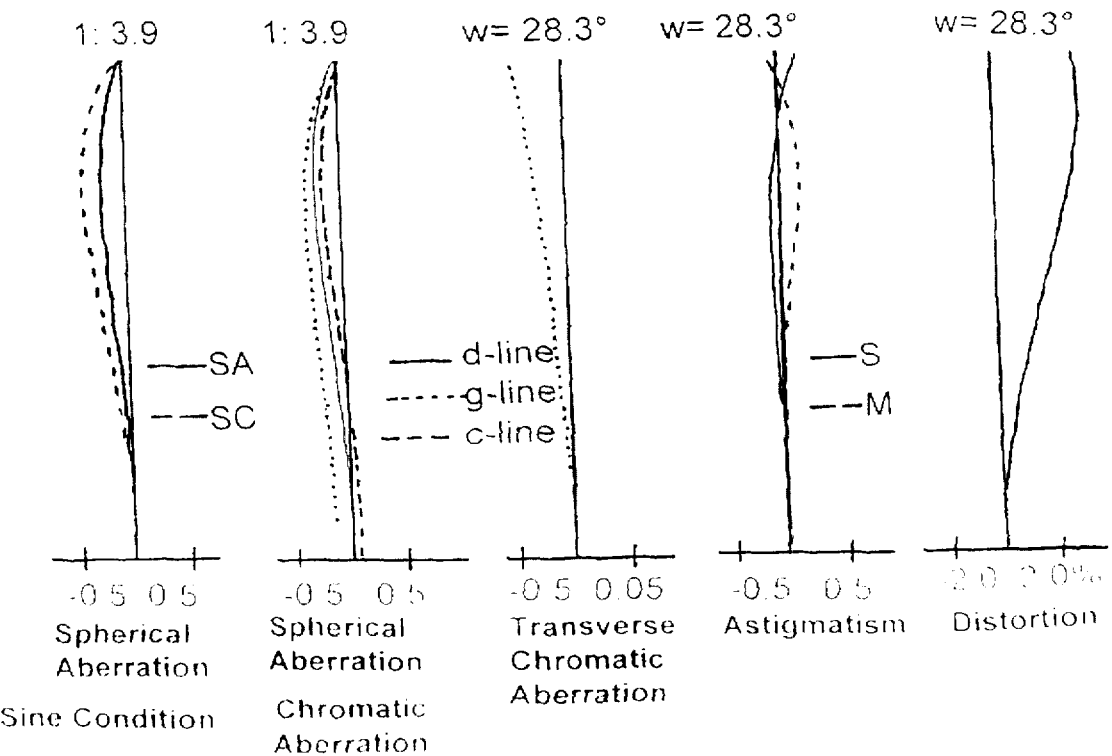

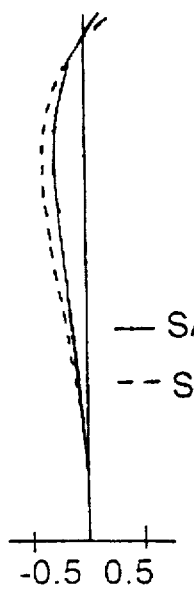
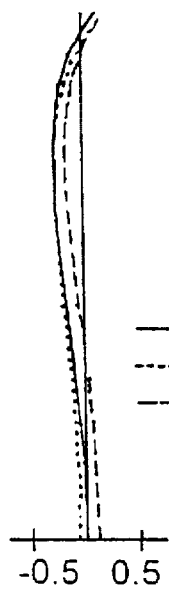
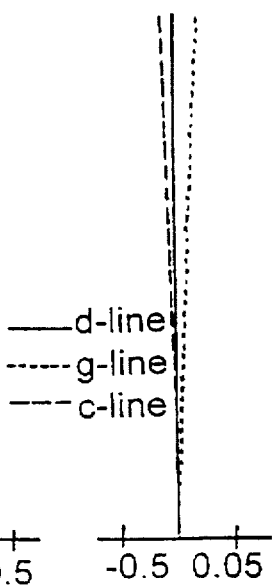
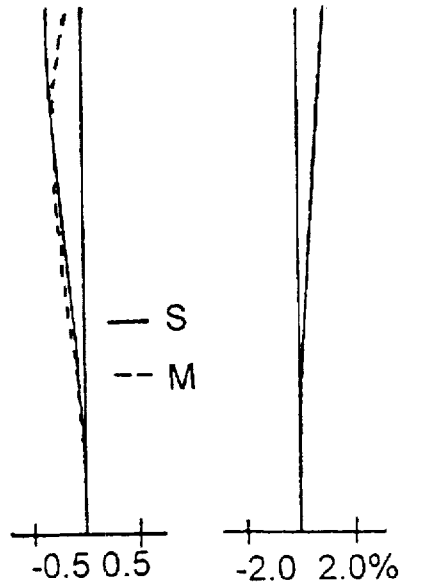
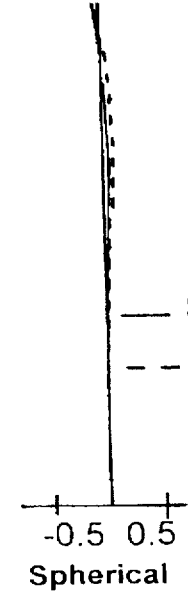
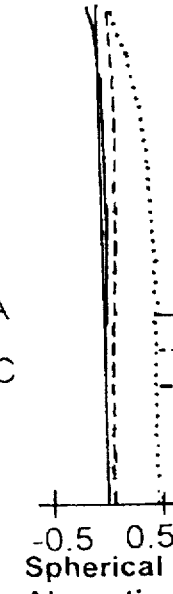
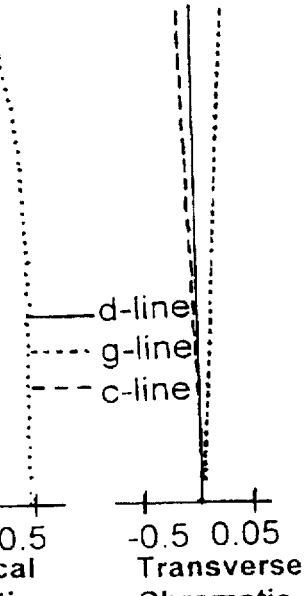
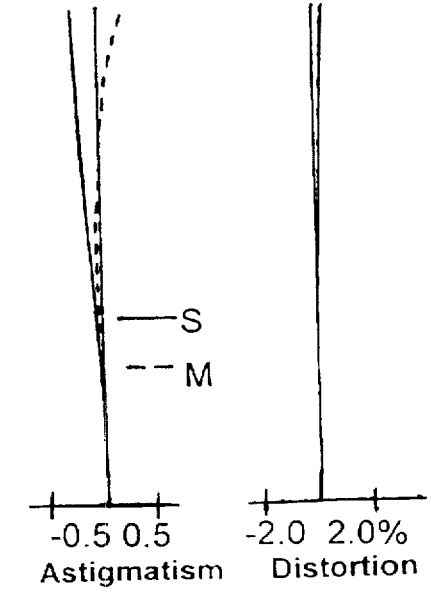

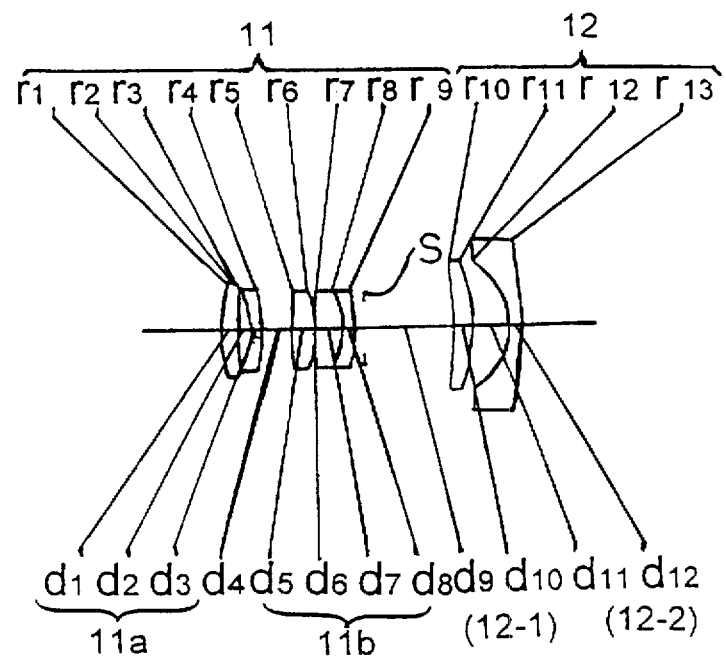
Fig. 5
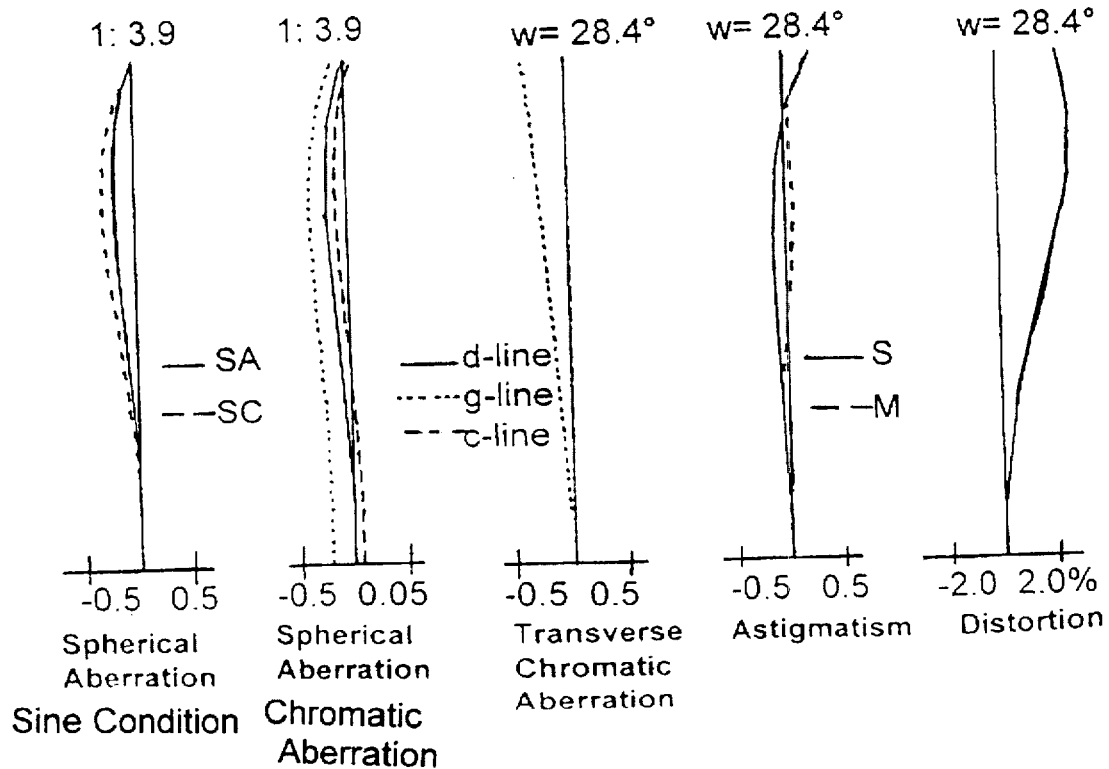

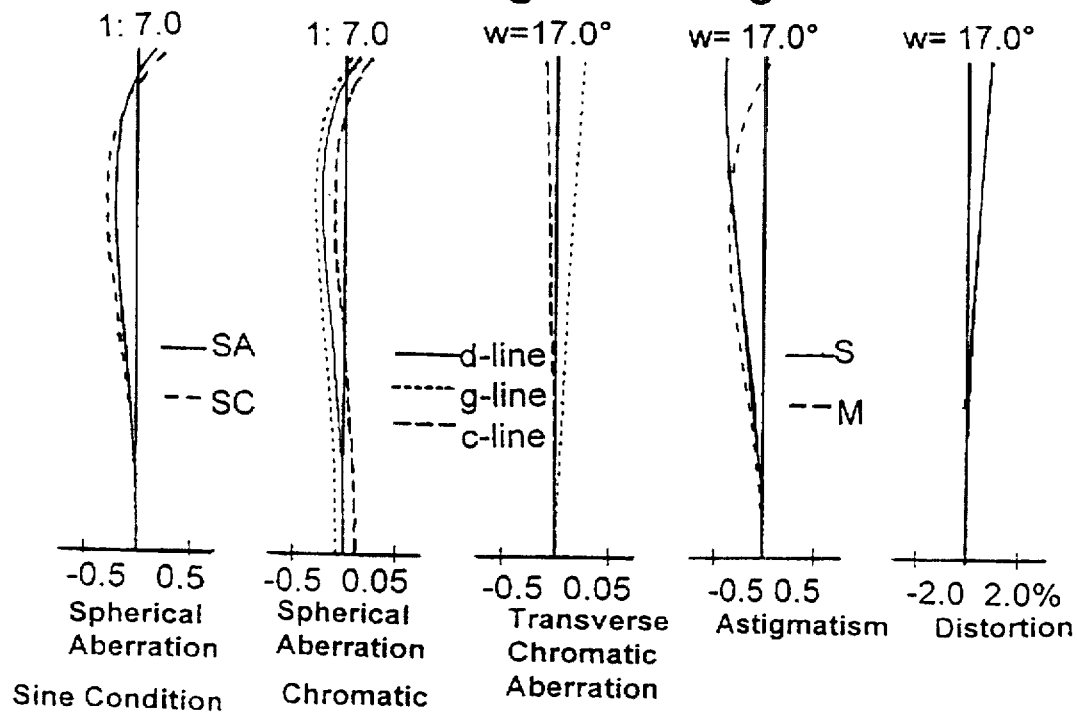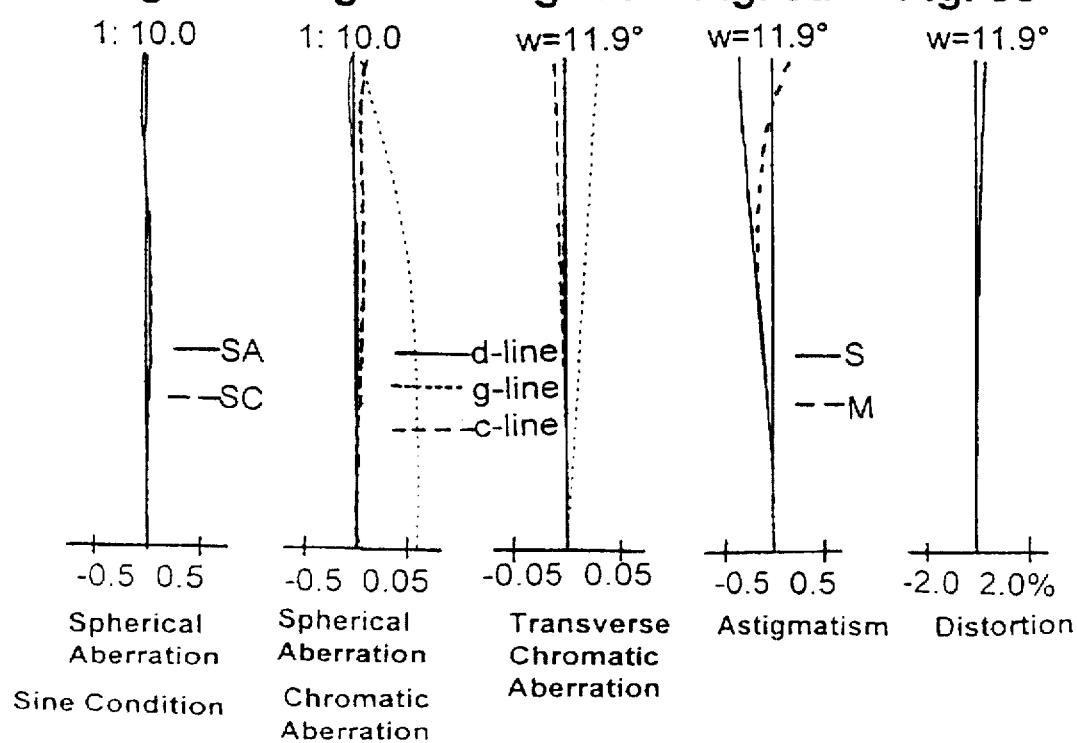

Fig.9
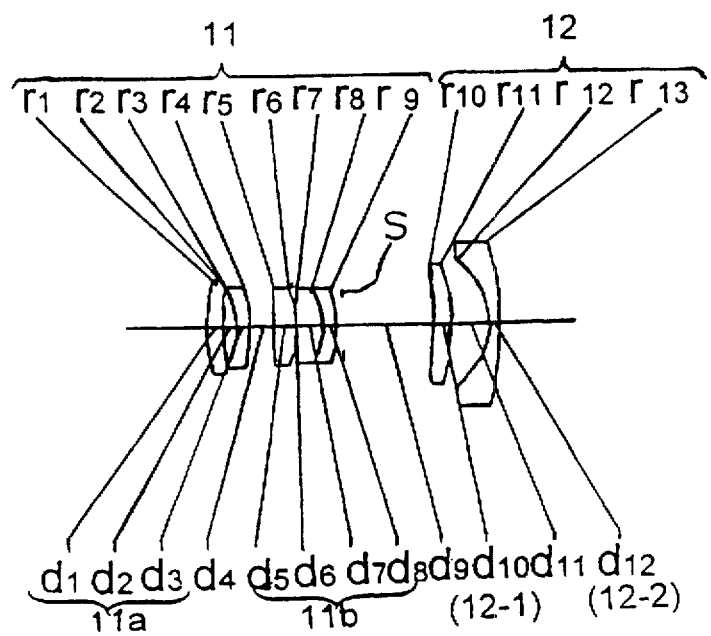
Fig.10a  Fig.10b  Fig.10c  Fig.10d  Fig.10e
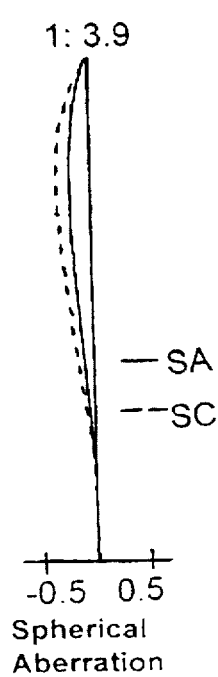
1: 3.9
-0.5  0.5
Spherical
Aberration
— SA
-- SC
Sine Condition
1: 3.9
-0.5  0.5
Spherical
Aberration
Chromatic
Aberration
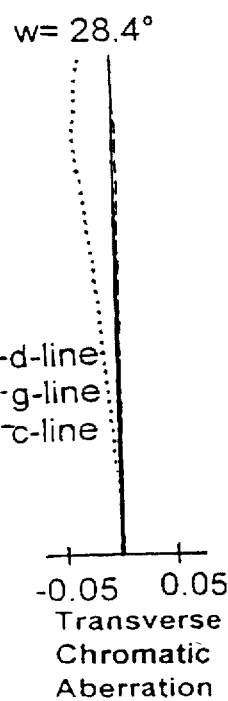
w= 28.4°
-0.05  0.05
Transverse
Chromatic
Aberration
—d-line
----g-line
-- c-line
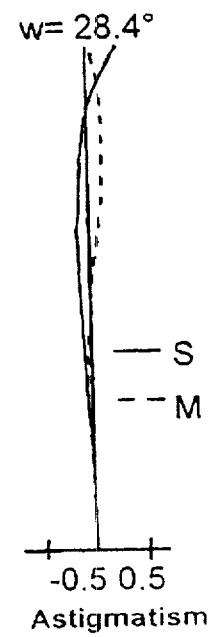
w= 28.4°
-0.5  0.5
Astigmatism
— S
-- M
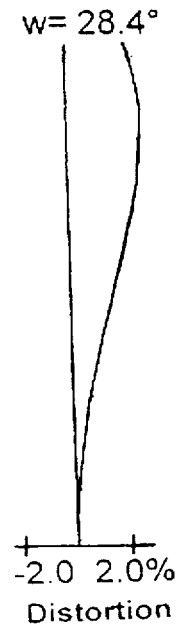
w= 28.4°
-2.0  2.0%
Distortion

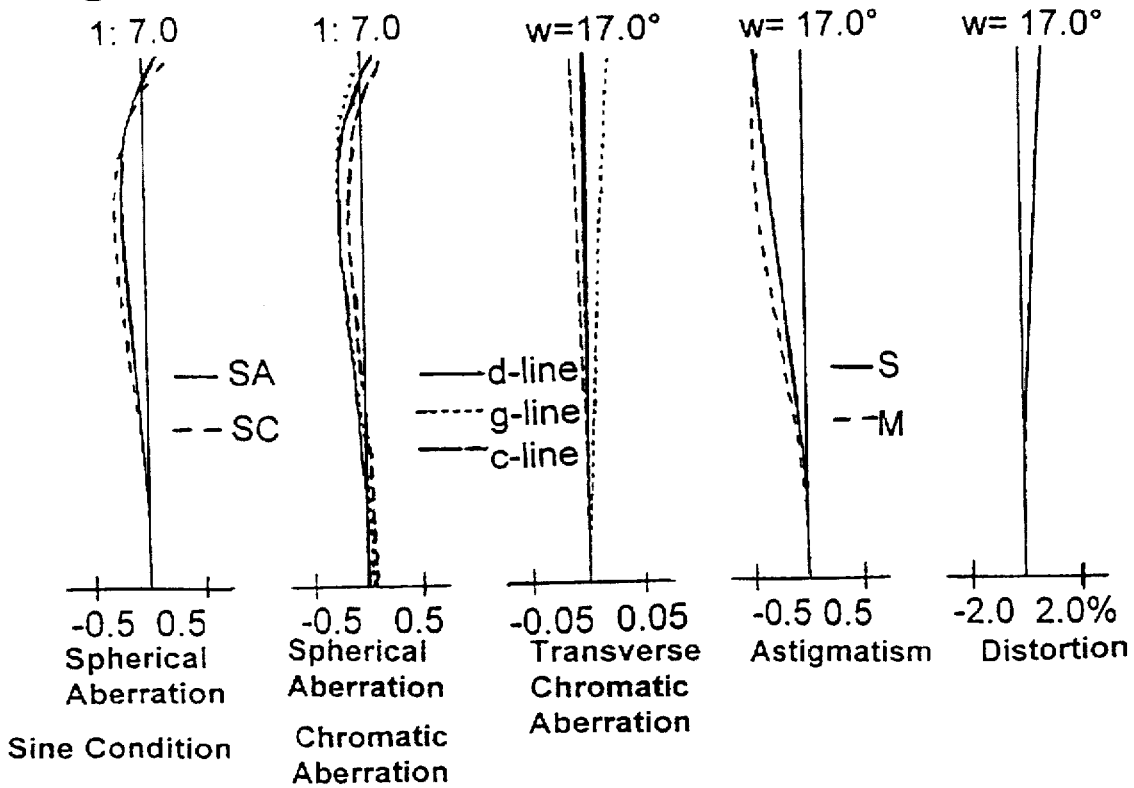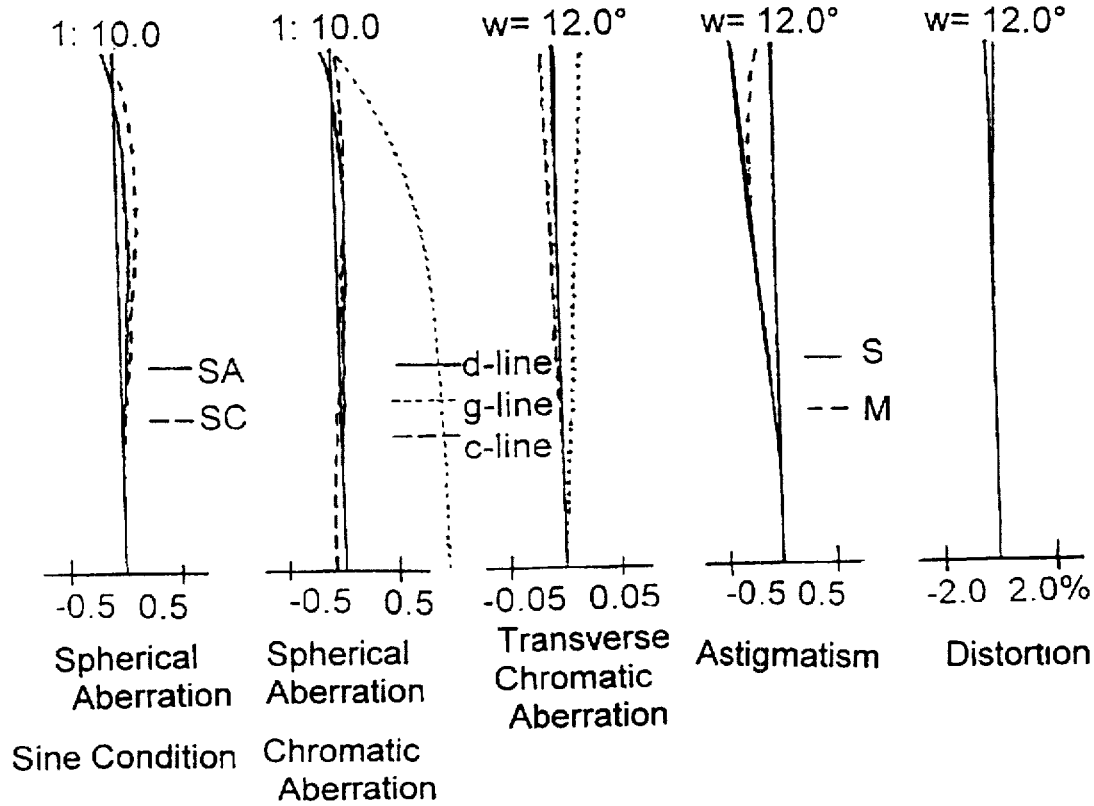

1: 3.5

— SA
--- SC

-0.5   0.5

Spherical
Aberration

Sine Condition

1: 3.5

—— d-line
······ g-line
--- c-line

-0.5   0.5

Spherical
Aberration
Chromatic
Aberration w= 30.1°

-0.05   0.05

Transverse
Chromatic w= 30.1°

— S
-- M

-0.5   0.5

Astigmatism w= 30.1°

-2.0  2.0%

Distortion

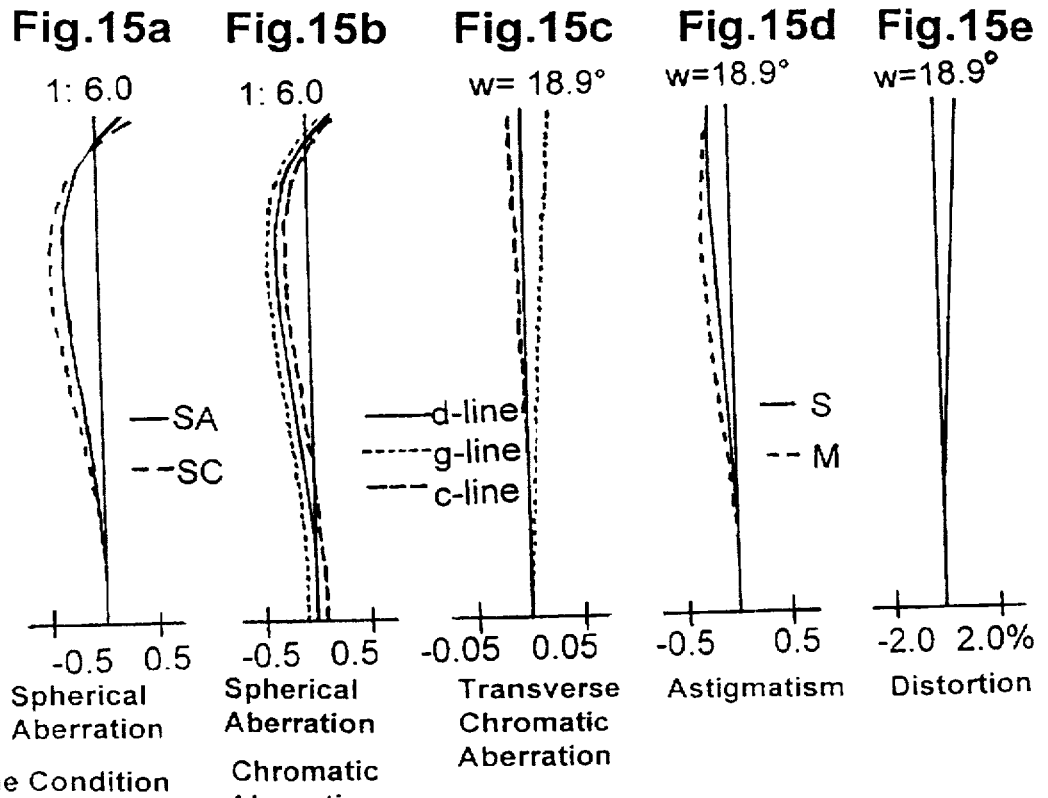

Fig. 17
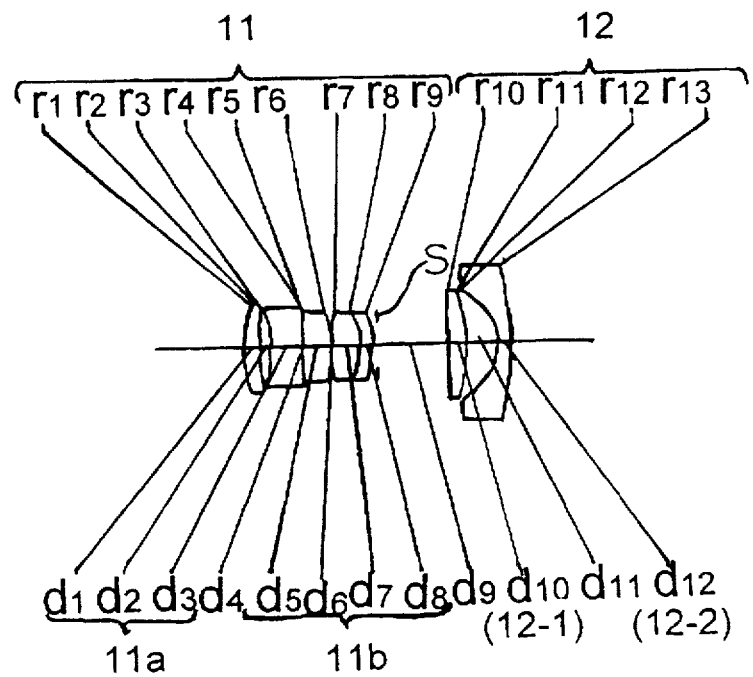
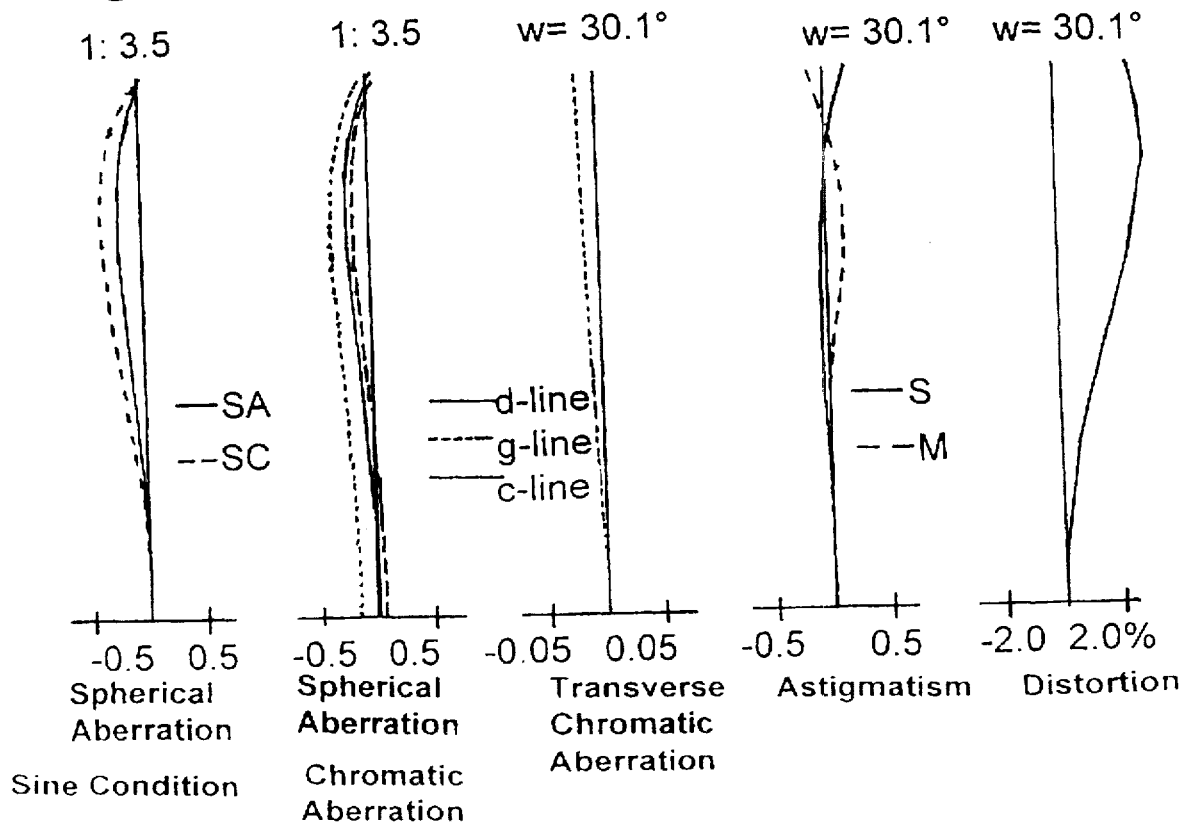

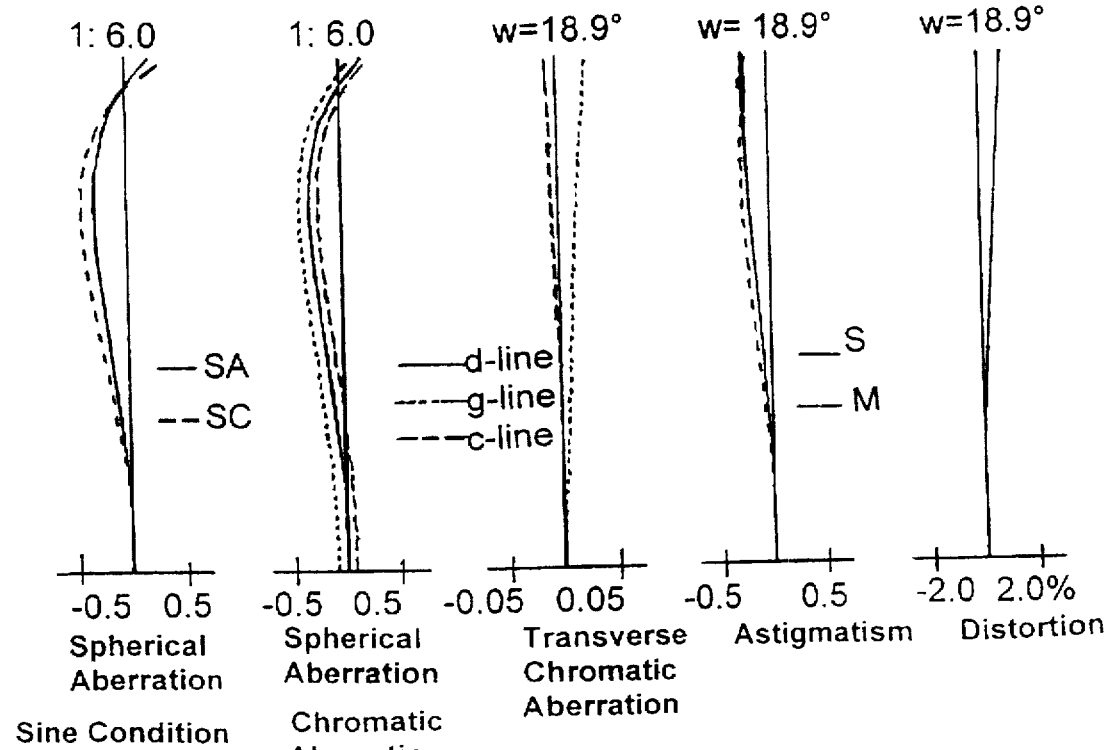

ZOOM LENS SYSTEM

BACKGROUND OF THE INVENTION

1. Field of the Invention

The present invention relates to a small, high performance zoom lens system having two lens groups, for a compact camera whose back focal distance is shorter than that of a single lens reflex camera.

2. Description of Related Art

There are two types of zoom lenses for a compact camera, i.e., a two-lens group type zoom lens and a multi-lens group type zoom lens. The two-lens group type is comprised of a positive first lens group and a negative second lens group, in this order from the object side. The multi-lens group type zoom lens has three or more lens groups, consisting of either a positive first lens group, a positive second lens group and a negative third lens group, or a negative first lens group, a positive second lens group and a negative third lens group, in this order from the object side. However, these types of lens groups suffer from a number of problems. For example, in the two-lens group type zoom lens, when the zooming ratio increases, it is difficult to correct aberrations (particularly, chromatic aberration), and the structure of the multi-lens group type zoom lens is complex.

SUMMARY OF THE INVENTION

The primary object of the present invention is to provide a small and high performance two-lens group type zoom lens having a high zooming ratio.

To achieve the object mentioned above, according to an aspect of the present invention, there is provided a zoom lens system comprising a first lens group having a positive focal length and a second lens group having a negative focal length, arranged in this order from the object side, whereby zooming is carried out by varying the distance between the first and second lens groups. The first lens group may comprise a first sub-group and a second sub-group, in this order from the object side. The first sub-group and the second sub-group are each provided with at least one negative lens element, wherein the zoom lens system satisfies the relationship defined by the following formulae (1) through (5):

(1) $3.5<f_L/f_1<5.0$ (2) $1.77<N_{1\,a\,N}$ (3) $35<\nu_{1\,a\,N}<50$ (4) $1.77<N_{1\,b\,N}$ (5) $35<\nu_{1\,b\,N}<50$ wherein:

"$f_L$" represents the focal length of the whole lens system at a telephoto extremity;

"$f_1$" represents the focal length of the first lens group;

"$N_{1\,a\,N}$" represents the refractive index of the negative lens element belonging to the first sub-group, at the d-line;

"$\nu_{1\,a\,N}$" represents the Abbe number of the negative lens element belonging to the first sub-group;

"$N_{1\,b\,N}$" represents the refractive index of the negative lens element belonging to the second sub-group, at the d-line; and, "$\nu_{1\,b\,N}$" represents the Abbe number of the negative lens element belonging to the second sub-group.

The second lens group can be comprised of a positive first lens element having a convex surface located on the image side and a negative second lens element having a concave surface located on the object side, in this order from the object side, wherein the second lens group satisfies the following formula (6):

(6) $\nu_{2-1}<35$ wherein, "$\nu_{2-1}$" represents the Abbe number of the positive first lens element belonging to the second lens group at the d-line.

Alternatively, the second lens group can be further comprised of, on the image side of the above-mentioned second negative lens element, a positive third lens element having a convex surface located on the image side, wherein the second lens group satisfies the above formula (6), in addition to the following formula (7):

(7) $\nu_{2-3}<35$ wherein, "$\nu_{2-3}$" represents the Abbe number of the positive third lens element of the second lens group, at the d-line.

If the zooming ratio is above 2.8, the zoom lens system preferably satisfies the following formula (1'):

(1') $4.0<f_L/f_1<5.0$

When zooming, the distances between the lens elements of the second lens group remain the same.

The present disclosure relates to subject matter contained in two Japanese Patent Application Nos. 6-320988 (filed on Dec. 22, 1994) and 7-200703 (filed on Aug. 7, 1995) which are expressly incorporated herein by reference in their entireties.

BRIEF DESCRIPTION OF THE DRAWINGS

The invention will be discussed below in detail with reference to the accompanying drawings, in which:

FIG. 1 is a schematic view of a lens arrangement of a zoom lens system, according to a first embodiment of the present invention;

FIGS. 2A–2E show diagrams of aberrations of the zoom lens system shown in FIG. 1, at a wide angle extremity;

FIGS. 3A–3E show diagrams of aberrations of the zoom lens system shown in FIG. 1, at an intermediate focal length;

FIGS. 4A–4E show diagrams of aberrations of the zoom lens system shown in FIG. 1, at a telephoto extremity;

FIG. 5 is a schematic view of a lens arrangement of a zoom lens system, according to a second embodiment of the present invention;

FIGS. 6A–6E show diagrams of aberrations of the zoom lens system shown in FIG. 5, at a wide angle extremity;

FIGS. 7A–7E show diagrams of aberrations of the zoom lens system shown in FIG. 5, at an intermediate focal length;

FIGS. 8A–8E show diagrams of aberrations of the zoom lens system shown in FIG. 5, at a telephoto extremity;

FIG. 9 is a schematic view of a lens arrangement of a zoom lens system, according to a third embodiment of the present invention;

FIGS. 10A–10E show diagrams of aberrations of the zoom lens system shown in FIG. 9, at a wide angle extremity;

FIGS. 11A–11E show diagrams of aberrations of the zoom lens system shown in FIG. 9, at an intermediate focal length;

FIGS. 12A–12E shows diagrams of aberrations of the zoom lens system shown in FIG. 9, at a telephoto extremity;

FIGS. 15A–15E shows diagrams of aberrations of the zoom lens system shown in FIG. 13, at an intermediate focal length;

FIGS. 16A–16E show diagrams of aberrations of the zoom lens system shown in FIG. 13, at a telephoto extremity;

FIG. 17 is a schematic view of a lens arrangement of a zoom lens system, according to a fifth embodiment of the present invention;

FIGS. 18A–18E show diagrams of aberrations of the zoom lens system shown in FIG. 17, at a wide angle extremity;

FIGS. 19A–19E show diagrams of aberrations of the zoom lens system shown in FIG. 17, at an intermediate focal length; and, FIGS. 20A–20E show diagrams of aberrations of the zoom lens system shown in FIG. 17, at a telephoto extremity.

DESCRIPTION OF THE PREFERRED EMBODIMENT

Figure 13:
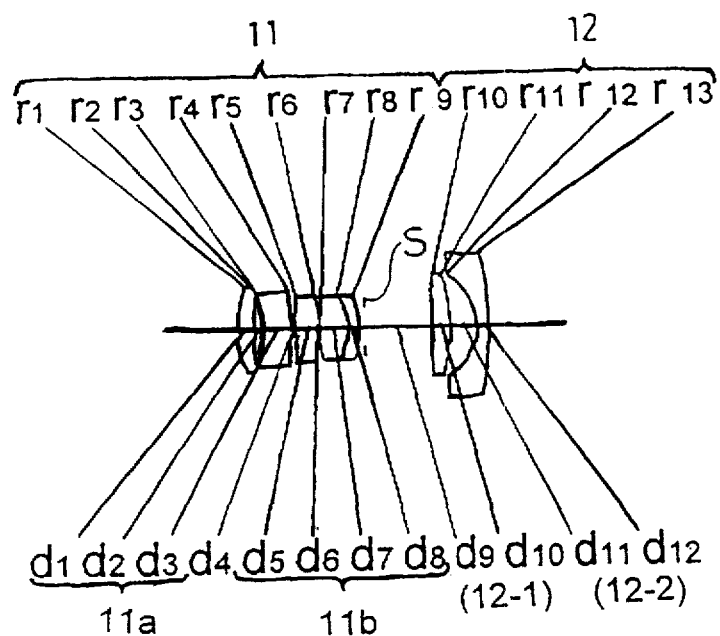
FIG. 13 is a schematic view of a lens arrangement of a zoom lens system, according to a fourth embodiment of the present invention.
Figure 14A:
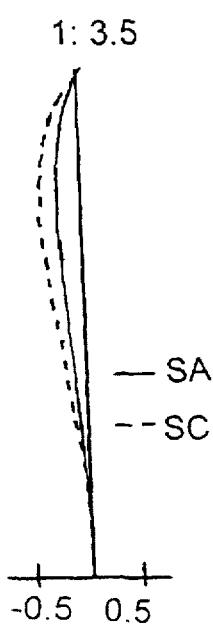
FIGS. 14A–14E show diagrams of aberrations of the zoom lens system shown in FIG. 13, at a wide angle extremity.
Figure 14B:
Figure 14C:
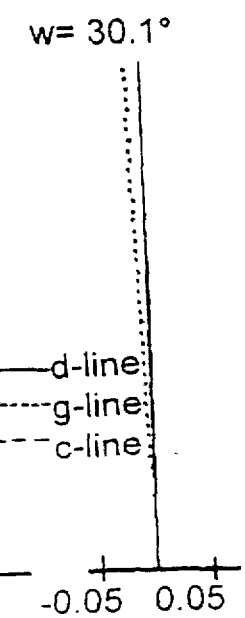
Figure 14D:
Figure 14E:
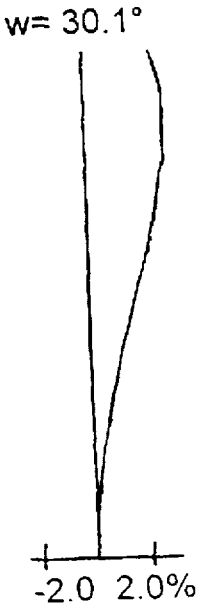

In order to miniaturize a two-lens group type zoom lens having a positive first lens group and a negative second lens group, arranged in this order from the object side, it is necessary to increase the powers of both groups. The formula (1) while specifying the power of the first lens group, also indirectly specifies the lateral magnification of the second lens group. Namely, when the power of the first lens group increases, the power of the second lens group also tends to increase. In the case where the ratio $f_L/f_1$ of formula (1) is below the minimum limit of 3.5, the change in magnification is large, and the movement of the lens groups becomes large, contrary to the miniaturization of the zoom lens system. Conversely, if the value of the ratio is above the upper limit defined in the formula (1), it becomes difficult to correct aberrations, although the zoom lens can be made small. Note that in almost all conventional two-lens group type zoom lenses, the value of the ratio is below the lower limit defined in the formula (1).

If the zooming ratio exceeds 2.8, the ratio $f_L/f_1$ is preferably set to satisfy the relationship defined by (1') $4.0 < f_L/f_1 < 5.0$, to restrict the movement of the lens groups and make the zoom lens system small.

The formulae (2) and (4) specify that the two negative lens elements of the first lens group are made of a material having a high refractive index. In the zoom lens system according to the present invention, since the first lens group has a positive power strong enough to satisfy the formula (1), at least one negative lens is provided in each of the front (first) and rear (second) sub-groups 1a and 1b belonging to the first lens group to effectively correct the aberrations. The negative lens element of the front sub-group 1a is adapted to effectively correct distortion and astigmatism, while the negative lens element of the rear sub-group 1b is adapted to effectively correct spherical aberration and comatic aberration.

The power of these negative lens elements increases as the whole lens length decreases. Consequently, the Petzval sum tends to become a negative value. As a result, the astigmatism of the sagittal rays on the short focus side becomes a large positive (plus) value. The formulae (2) and (4) specify the requirements on the refractive index, that the negative lens elements must meet to prevent the Petzval sum from being too small (negative value). Disregarding cost, it is preferable that at least one of the two negative lens elements is made of a glass material having a high refractive index, which satisfies either formula (2') $1.81 < N_{1\ a\ N}$ or formula (4') $1.81 < N_{1\ b\ N}$.

The negative lens elements having a high refractive index are preferably made of materials having Abbe numbers larger than the lower limits defined in the formulae (3) and (5). If the Abbe numbers are larger than the upper limits defined in the formulae (3) and (5), the chromatic aberration of the first lens group cannot be satisfactorily corrected.

In the present invention, since the first lens group has a strong power as defined in the formula (1), to realize a compact and high zooming ratio zoom lens, if the negative lens elements of the first lens group are made of such a material having a high dispersive quality and having an Abbe number below the lower limit defined in the formula (3) or (5), no aberration correction can be effectively carried out on the short focal length side, and an over correction tends to occur on the long focal length side, respectively. Under the condition defined in the formula (1), the chromatic aberration can be effectively compensated by making the negative lens elements of a material having an intermediate Abbe number, larger than the lower limits but smaller than the upper limits defined in the formulae (3) and (5).

The formulae (6) and (7) relate to the material of the lens elements belonging to the second lens group having a negative focal length to correct chromatic aberration. As mentioned above, the second lens group can be comprised of:

(1) a positive first lens element having a convex surface located on the image surface side and a negative second lens element having a concave surface located on the object side, arranged in this order from the object side, or (2) a positive first lens element having a convex surface located on the image surface side, a negative second lens element having a concave surface located on the object side, and a positive third lens element having a convex surface located on the image side, arranged in this order from the object side.

In case of alternative (1), the positive lens of the second lens group that is located on the object side is preferably made of a material having a large dispersive quality which satisfies the requirement defined in the formula (6) to correct the chromatic aberration in the negative second lens group. If the Abbe number is above the upper limit defined in the formula (6), no chromatic aberration can be sufficiently corrected for in the second lens group.

In the case of alternative (2), the provision of the positive lens elements in the second lens group on the object and the image side, respectively, makes it possible to correct the chromatic aberration without excessively increasing the power of each positive lens element. The two positive lens elements are preferably made of a material having a large dispersive quality that satisfies the formulae (6) and (7).

The reason that the second lens group is comprised of the two lens elements described in alternative (1) or the three lens elements described in alternative (2) is because not only can the astigmatism and the distortion be easily corrected, but also the lens assembly is little influenced by errors, such as, a positional deviation or inclination of the lens surfaces, etc., caused upon manufacturing or assembling, by the combination of the lens surfaces concentric to the diaphragm (located behind the first lens group).

Five numerical examples (embodiments) of the zoom lens according to the present invention will be discussed below. In the five embodiments, the diaphragm S is located behind the first lens group and is movable together with the first lens group. In the embodiments the zooming ratio is greater than 2.5.

1st Embodiment:

FIG. 1 shows a first embodiment of a zoom lens system according to the present invention, in which the first lens group 11 is comprised of a first sub-group 11a and a second sub-group 11b, in this order from the object side. The second lens group 12 is comprised of three lens elements consisting of a positive first lens element 12-1 having a convex surface located on the image surface side, a negative second lens element 12-2 having a concave surface located on the object side, and a positive third lens element 12-3 having a convex surface located on the image surface side, arranged in this order from the object side. The negative second lens element 12-2 and the positive third lens element 12-3 are cemented to each other. In the first embodiment, the first sub-group 11a has a negative focal length and the second sub-group 11b has a positive focal length, respectively Numerical data regarding the zoom lens system of the first embodiment is shown in Table 1 below, and the aberrations at a wide angle extremity, an intermediate focal length and a telephoto extremity are shown in FIGS. 2A–2E, 3A–E and 4A–E respectively. In the drawings, "SA" represents the spherical aberration, "SC" represents the sine condition, "d-line", "g-line" and "C-line" represent the chromatic aberrations represented by the spherical aberrations and the lateral chromatic aberration at the respective wavelengths, "S" represents the sagittal rays, and "M" represents the meridional rays, respectively.

In following tables and drawings, "$F_{NO}$" designates the F-number, "f" the focal length, "ω" the half angle of view, "$f_B$" the back focal distance, "Z" the zooming ratio, "r" the radius of curvature, "d" the lens thickness of the lenses or the distance between the lenses, "Nd" the refractive index at the d-line, and "ν d" the Abbe number at the d-line, respectively.

TABLE 1

$F_{NO}$= 1:3.9–7.0–10.2
f = 39.10–70.00–102.00 (Z = 2.61)
ω = 28.3–17.0–11.9
$f_B$ = 9.00–34.60–61.10
Position of diaphragm S is 0.80 mm behind the last surface (the ninth surface) of the first lens group.

| Surface No. | r | d | N d | ν d |
|---|---|---|---|---|
| 1 | 17.992 | 2.10 | 1.51633 | 64.1 |
| 2 | 30.803 | 1.88 | — | — |
| 3 | –13.957 | 1.74 | 1.80400 | 46.6 |
| 4 | –33.036 | 1.75 | — | — |
| 5 | 153.568 | 3.24 | 1.51742 | 52.4 |
| 6 | –14.922 | 0.10 | — | — |
| 7 | 55.595 | 3.55 | 1.51821 | 65.0 |
| 8 | –10.787 | 1.60 | 1.83400 | 37.2 |
| 9 | –22.425 | 11.49–5.32–2.87 | — | — |
| 10* | –40.015 | 2.67 | 1.58547 | 29.9 |
| 11 | –22.871 | 4.29 | — | — |
| 12 | –10.015 | 1.50 | 1.77250 | 49.6 |
| 13 | –125.591 | 2.00 | 1.80518 | 25.4 |
| 14 | –52.499 | — | — | — |

Aspherical Data-
No. 10:  K = 0.0, A4 = 0.69412 × $10^{-4}$, A6 = 0.29909 × $10^{-6}$,
A8 = 0.42828 × $10^{-8}$, A10 = 0.0, A12 = 0.0

*designates that the surface is aspherical.

The shape of the aspherical surface can be generally expressed as follows:

$$x = Ch^2/\{1+[1-(1+K)C^2h^2]^{1/2}\}+A4h^4+A6h^6+A8h^8+$$

wherein, "h" represents a height above the axis;

"x" represents a distance from a tangent plane of an aspherical vertex;

"C" represents a curvature of the aspherical vertex(1/r);

"K" represents a conic constant;

"A4" represents a fourth-order aspherical factor;

"A6" represents a sixth-order aspherical factor; and

"A8" represents an eighth-order aspherical factor.

2nd Embodiment:

FIG. 5 shows a second embodiment of a zoom lens system according to the present invention, in which the basic structure of the first lens group 11 is the same as that of the first embodiment shown in FIG. 1, but the second lens group 12 is comprised of two lens elements consisting of a positive first lens element 12-1 having a convex surface located on the image surface side and a negative second lens element 12-2 having a concave surface located on the object side, arranged in this order from the object side.

Numerical data regarding the zoom lens system of the second embodiment is shown in Table 2 below, and the aberrations at a wide angle extremity, an intermediate focal length and a telephoto extremity are shown in FIGS. 6A–E, 7A–E, and 8A–E respectively.

TABLE 2

$F_{NO}$ = 1:3.9–7.0–10.2
f = 39.10–70.00–102.00 (Z = 2.61)
ω = 28.4–17.0–11.9
$f_B$ = 9.59–35.19–61.69
Position of diaphragm S is 1.10 mm behind the last surface (the ninth surface) of the first lens group.

| Surface No. | r | d | N d | ν d |
|---|---|---|---|---|
| 1 | 22.512 | 2.10 | 1.48749 | 70.2 |
| 2 | 49.260 | 1.58 | — | — |
| 3 | –15.294 | 1.35 | 1.83481 | 42.7 |
| 4 | –30.778 | 3.66 | — | — |
| 5 | 149.034 | 2.87 | 1.51633 | 64.1 |
| 6 | –16.836 | 0.10 | — | — |
| 7 | 98.227 | 3.42 | 1.51742 | 52.4 |
| 8 | –11.278 | 1.55 | 1.83400 | 37.2 |
| 9 | –22.266 | 12.65–5.87–3.17 | — | — |
| 10* | –43.815 | 2.58 | 1.58547 | 29.9 |
| 11* | –25.397 | 4.81 | — | — |
| 12 | –10.675 | 1.50 | 1.72916 | 54.7 |
| 13 | –65.116 | — | — | — |

Aspherical Data-
No. 10:  K = 0.0, A4 = 0.37425 × $10^{-4}$, A6 = 0.58266 × $10^{-6}$,
A8 = –0.21222 × $10^{-8}$, A10 = 0.0, A12 = 0.0
No. 11:  K = 0.0, A4 = –0.21131 × $10^{-4}$, A6 = 0.36410 × $10^{-6}$,
A8 = –0.46460 × $10^{-8}$, A10 = 0.0, A12 = 0.0

*designates that the surface is aspherical

3rd Embodiment:

FIG. 9 shows a third embodiment of a zoom lens system according to the present invention, in which the basic lens arrangement is the same as that of the second embodiment shown in FIG. 5.

Numerical data regarding the zoom lens system of the third embodiment is shown in Table 3 below, and the aberrations at a wide angle extremity, an intermediate focal length and a telephoto extremity are shown in FIGS. 10A–E, 11A–E, and 12A–E respectively.

TABLE 3

$F_{NO} = 1:3.9-7.0-10.2$
$f = 39.10-70.00-102.00$ (Z = 2.61)
$\omega = 28.4-17.0-12.0$
$f_B = 9.47-35.81-63.08$
Position of diaphragm S is 0.80 mm behind the last surface
(the ninth surface) of the first lens group.

| Surface No. | r | d | N d | ν d |
|---|---|---|---|---|
| 1 | 20.550 | 2.10 | 1.48749 | 70.2 |
| 2 | 42.672 | 1.65 | — | — |
| 3 | −15.428 | 1.66 | 1.83400 | 37.2 |
| 4 | −30.458 | 3.06 | — | — |
| 5 | 631.122 | 2.80 | 1.51633 | 64.1 |
| 6 | −16.980 | 0.10 | — | — |
| 7 | 91.952 | 3.42 | 1.53996 | 59.5 |
| 8 | −11.244 | 1.60 | 1.80400 | 46.6 |
| 9 | −23.784 | 12.55−5.42−2.59 | — | — |
| 10* | −42.469 | 2.48 | 1.58547 | 29.9 |
| 11 | −26.490 | 5.04 | — | — |
| 12 | −10.416 | 1.50 | 1.71299 | 53.9 |
| 13 | −48.829 | — | — | — |

Aspherical Data-
No. 10: $K = 0.0$, $A4 = 0.59622 \times 10^{-4}$, $A6 = 0.25265 \times 10^{-6}$
$A8 = 0.28963 \times 10^{-8}$, $A10 = 0.0$, $A12 = 0.0$

*designates that the surface is aspherical.

4th Embodiment:

FIG. 13 shows a fourth embodiment of a zoom lens system according to the present invention, in which the basic lens arrangement is the same as that of the second embodiment shown in FIG. 5.

Numerical data regarding the zoom lens system of the fourth embodiment is shown in Table 4 below, and the aberrations at a wide angle extremity, an intermediate focal length and a telephoto extremity are shown in FIGS. 14A–E, 15A–E, and 16A–E respectively.

TABLE 4

$F_{NO} = 1:3.6-6.2-10.3$
$f = 39.05-50.00-83.00$ (Z = 2.86)
$\omega = 30.1-18.9-11.7$
$f_B = 7.05-24.80-52.74$
Position of diaphragm S is 0.75 mm behind the last surface
(the ninth surface) of the first lens group.

| Surface No. | r | d | N d | ν d |
|---|---|---|---|---|
| 1 | 20.519 | 2.00 | 1.58144 | 40.7 |
| 2 | 63.956 | 1.26 | — | — |
| 3 | −13.675 | 3.50 | 1.83400 | 37.2 |
| 4 | −77.662 | 0.50 | — | — |
| 5 | 212.248 | 2.98 | 1.48749 | 70.2 |
| 6 | −14.500 | 0.10 | — | — |
| 7 | 31.509 | 3.46 | 1.51823 | 59.0 |
| 8 | −8.315 | 1.40 | 1.83481 | 42.7 |
| 9 | −14.134 | 9.50−4.76−2.15 | — | — |
| 10* | −31.994 | 2.15 | 1.58547 | 29.9 |
| 11 | −20.351 | 3.75 | — | — |
| 12 | −7.667 | 1.50 | 1.69680 | 55.5 |
| 13 | −40.281 | — | — | — |

Aspherical Data-
No. 10: $K = 0.0$, $A4 = 0.14588 \times 10^{-3}$, $A6 = 0.67501 \times 10^{-6}$,
$A8 = 0.31082 \times 10^{-7}$, $A10 = 0.0$, $A12 = 0.0$

*designates that the surface is aspherical.

5th Embodiment:

FIG. 17 shows a fifth embodiment of a zoom lens system according to the present invention, in which the basic lens arrangement is the same as that of the second embodiment shown in FIG. 5.

Numerical data regarding the zoom lens system of the fifth embodiment is shown in Table 5 below, and the aberrations at a wide angle extremity, an intermediate focal length and a telephoto extremity are shown in FIGS. 18A–E, 19A–E, and 20A–E respectively.

TABLE 5

$F_{NO} = 1:3.6-6.2-10.3$
$f = 29.05-50.00-83.00$ (Z = 2.86)
$\omega = 30.1-18.9-11.7$
$f_B = 7.03-24.68-52.48$
Position of diaphragm S is 0.75 mm behind the last surface
(the ninth surface) of the first lens group.

| Surface No. | r | d | N d | ν d |
|---|---|---|---|---|
| 1 | 18.990 | 2.00 | 1.51742 | 52.4 |
| 2 | 96.284 | 1.20 | — | — |
| 3 | −14.173 | 3.82 | 1.83481 | 42.7 |
| 4 | −348.482 | 0.20 | — | — |
| 5 | 227.735 | 3.24 | 1.48749 | 70.2 |
| 6 | −14.069 | 0.10 | — | — |
| 7 | 27.577 | 3.49 | 1.52249 | 59.8 |
| 8 | −8.441 | 1.40 | 1.83481 | 42.7 |
| 9 | −14.395 | 9.53−4.77−2.15 | — | — |
| 10* | −36.588 | 2.16 | 1.58547 | 29.9 |
| 11 | −21.650 | 3.76 | — | — |
| 12 | −7.650 | 1.50 | 1.69680 | 55.5 |
| 13 | −41.750 | — | — | — |

Aspherical Data-
No. 10: $K = 0.0$, $A4 = 0.14756 \times 10^{-3}$, $A6 = 0.68350 \times 10^{-6}$,
$A8 = 0.30229 \times 10^{-7}$, $A10 = 0.0$, $A12 = 0.0$

*designates that the surface is aspherical.

Table 6 below shows numerical data regarding the formulae (1) through (7) corresponding to the five embodiments.

TABLE 6

| | Embodiment 1 | Embodiment 2 | Embodiment 3 |
|---|---|---|---|
| formula (1) | 3.97 | 3.79 | 3.75 |
| formula (2) | 1.804 | 1.835 | 1.834 |
| formula (3) | 46.6 | 42.7 | 37.2 |
| formula (4) | 1.834 | 1.834 | 1.804 |
| formula (5) | 37.2 | 37.2 | 46.6 |
| formula (6) | 29.9 | 29.9 | 29.9 |
| formula (7) | 25.4 | — | — |

| | Embodiment 4 | Embodiment 5 |
|---|---|---|
| formula (1) | 4.21 | 4.19 |
| formula (2) | 1.834 | 1.835 |
| formula (3) | 37.2 | 42.7 |
| formula (4) | 1.835 | 1.835 |
| formula (5) | 42.7 | 42.7 |
| formula (6) | 29.9 | 29.9 |
| formula (7) | — | — |

As can be seen from Table 6, the numerical values of the five embodiments satisfy the formulae (1) through (6) (and (7)). Moreover, the aberrations can be effectively corrected in the zoom lens system according to the present invention.

As can be understood from the above discussion, according to the present invention, a small and high performance zoom lens system having a zooming ratio of more than 2.5 and which is comprised of two lens groups can be obtained.

What is claimed is:

1. A zoom lens system comprising a first lens group having a positive focal length and a second lens group having a negative focal length, arranged in this order from an object side, whereby zooming is carried out by varying a distance between said first and second lens groups;

said first lens group comprising a first sub-group and a second sub-group, in this order from the object side, said first sub-group and said second sub-group each comprising at least one negative lens element, wherein said zoom lens system satisfies the following relationships:

$3.5 < f_L/f_1 < 5.0$ $1.77 < N_{1\,a\,N}$ $35 < \upsilon_{1\,a\,N} < 50$ $1.77 < N_{1\,b\,N}$ $35 < \upsilon_{1\,b\,N} < 50$ wherein, "$f_L$" represents the focal length of said zoom lens system at a telephoto extremity;

"$f_1$" represents the focal length of said first lens group;

"$N_{1\,a\,N}$" represents the refractive index of the negative lens element of said first sub-group at the d-line;

"$\upsilon_{1\,a\,N}$" represents the Abbe number of the negative lens element of said first sub-group;

"$N_{1\,b\,N}$" represents the refractive index of the negative lens element of said second sub-group at the d-line; and "$\upsilon_{1\,b\,N}$" represents the Abbe number of the negative lens element of said second sub-group;

said second lens group comprising a positive first lens element having a convex surface located on an image side, a negative second lens element having a concave surface located on the object side, and a positive third lens element having a convex surface located on the image side, said positive first lens element, said negative second lens element and said positive third lens element being arranged in this order from the object side, wherein said second lens group satisfies the following relationships:

$\upsilon_{2-1} < 35$ $\upsilon_{2-3} < 35$ wherein,

"$\upsilon_{2-1}$" represents the Abbe number of the positive first lens element of said second lens group at the d-line; and, "$\upsilon_{2-3}$" represents the Abbe number of the positive third lens element of said second lens group, that is located on the image side, at the d-line.

2. The zoom lens system according to claim 1, said second lens group comprising a positive first lens element having a convex surface located on an image side and a negative second lens element having a concave surface located on the object side, said positive first lens element and said negative second lens element being arranged in this order from the object side, wherein said second lens group satisfies the following relationship:

$\upsilon_{2-1} < 35$ wherein "$\upsilon_{2-1}$" represents the Abbe number of said positive first lens element of said second lens group at the d-line.

3. The zoom lens system according to claim 1, wherein said zoom lens system satisfies the relationship defined by the following relationship:

$1.81 < N_{1\,a\,N}$.

4. The zoom lens system according to claim 1, wherein a zooming ratio of said zoom lens system is above 2.8, and said zoom lens system satisfies the relationship defined by the following relationship:

$4.0 < f_L/f_1 < 5.0$.

5. The zoom lens system according to claim 1, wherein said first sub-group has a negative focal length, and said second sub-group has a positive focal length.

6. The zoom lens system according to claim 1, wherein said negative second lens element and said positive third lens element are cemented to each other.

7. The zoom lens system according to claim 1, wherein said zoom lens system satisfies the relationship defined by the following relationship:

$1.81 < N_{1\,b\,N}$.

8. A zoom lens system comprising a first lens group having a positive focal length and a second lens group having a negative focal length, arranged in this order from an object side, whereby zooming is carried out by varying a distance between said first and second lens groups, a diaphragm positioned between said first lens group and said second lens group, said first lens group comprising a first sub-group and a second sub-group, in this order from the object side, said first sub-group and said second sub-group each comprising at least one negative lens element, wherein said zoom lens system satisfies the following relationships:

$3.5 < f_L/f_1 < 5.0$ $1.81 < N_{1aN}$ $35 < \upsilon_{1\,a\,N} < 50$ $1.77 < N_{1\,b\,N}$ $35 < \upsilon_{1\,b\,N} < 50$ wherein, "$f_L$" represents the focal length of said zoom lens system at a telephoto extremity;

"$f_1$" represents the focal length of said first lens group;

"$N_{1\,a\,N}$" represents the refractive index of the negative lens element of said first sub-group at the d-line;

"$\upsilon_{1\,a\,N}$" represents the Abbe number of the negative lens element of said first sub-group;

"$N_{1\,b\,N}$" represents the refractive index of the negative lens element of said second sub-group at the d-line; and "$\upsilon_{1\,b\,N}$" represents the Abbe number of the negative lens element of said second sub-group.

9. The zoom lens system according to claim 8 said second lens group comprising a positive first lens element having a convex surface located on an image side and a negative second lens element having a concave surface located on the object side, said positive first lens element and said negative second lens element being arranged in this order from the object side, wherein said second lens group satisfies the following relationship:

$\upsilon_{2-1} < 35$ wherein "$\upsilon_{2-1}$" represents the Abbe number of said positive first lens element of said second lens group at the d-line.

10. The zoom lens system according to claim 8, said second lens group comprising a positive first lens element having a convex surface located on an image side, a negative second lens element having a concave surface located on the object side, and a positive third lens element having a convex surface located on the image side, said positive first lens element, said negative second lens element and said positive third lens element being arranged in this order from the object side, wherein said second lens group satisfies the following relationships:

$\upsilon_{2-1} < 35$ $\upsilon_{2-3} < 35$ wherein,

"$\upsilon_{2-1}$" represents the Abbe number of the positive first lens element of said second lens group at the d-line; and, "$\upsilon_{2-3}$" represents the Abbe number of the positive third lens element of said second lens group, that is located on the image side, at the d-line.

11. The zoom lens system according to claim 8, wherein a zooming ratio of said zoom lens system is above 2.8, and said zoom lens system satisfies the following relationship:

$4.0 < f_t/f_1 < 5.0$.

12. The zoom lens system according to claim 8, wherein said first sub-group has a negative focal length, and said second sub-group has a positive focal length.

13. The zoom lens system according to claim 10, wherein said negative second lens element and said positive third lens element are cemented to each other.

14. The zoom lens system according to claim 8, wherein said zoom lens system satisfies the following relationship:

$1.81 < N_{1\,b\,N}$.

15. A zoom lens system comprising a first lens group having a positive focal length and a second lens group having a negative focal length, arranged in this order from an object side, whereby zooming is carried out by varying a distance between said first and second lens groups, said first lens group comprising a first sub-group and a second sub-group, in this order from the object side, said first sub-group and said second sub-group each comprising at least one negative lens element, wherein said zoom lens system satisfies the following relationship:

$3.75 < f_t f_1 < 5.0$ $1.77 < N_{a\,N}$ $35 < \upsilon_{a\,N} < 50$ wherein,

"$f_t$" represents the focal length of said zoom lens system at a telephoto extremity;

"$f_1$" represents the focal length of said first lens group;

"$N_{a\,N}$" represents the refractive index of each negative lens element of said first lens group at the d-line; and "$\upsilon_{a\,N}$" represents the Abbe number of each negative lens element of said first lens group.

16. The zoom lens system according to claim 15, said second lens group comprising a positive first lens element having a convex surface located on an image side and a negative second lens element having a concave surface located on the object side, said positive first lens element and said negative second lens element being arranged in this order from the object side, wherein said second lens group satisfies the following relationship:

$\upsilon_{2-1} < 35$ wherein "$\upsilon_{2-1}$" represents the Abbe number of said positive first lens element of said second lens group at the d-line.

17. The zoom lens system according to claim 15, said second lens group comprising a positive first lens element having a convex surface located on an image side, a negative second lens element having a concave surface located on the object side, and a positive third lens element having a convex surface located on the image side, said positive first lens element, said negative second lens element and said positive third lens element being arranged in this order from the object side, wherein said second lens group satisfies the following relationships:

$\upsilon_{2-1} < 35$ $\upsilon_{2-3} < 35$ wherein,

"$\upsilon_{2-1}$" represents the Abbe number of the positive first lens element of said second lens group at the d-line; and, "$\upsilon_{2-3}$" represents the Abbe number of the positive third lens element of said second lens group, that is located on the image side, at the d-line.

18. The zoom lens system according to claim 15, wherein a zooming ratio of said zoom lens system is above 2.8, and said zoom lens system satisfies the following relationship:

$4.0 < f_t/f_1 < 5.0$.

19. The zoom lens system according to claim 15, wherein said first sub-group has a negative focal length, and said second sub-group has a positive focal length.

20. The zoom lens system according to claim 17, wherein said negative second lens element and said positive third lens element are cemented to each other.

* * * * *